United States Patent
Quah et al.

(10) Patent No.: US 10,268,683 B2
(45) Date of Patent: Apr. 23, 2019

(54) GENERATING OUTPUT FOR PRESENTATION IN RESPONSE TO USER INTERFACE INPUT, WHERE THE INPUT AND/OR THE OUTPUT INCLUDE CHATSPEAK

(71) Applicant: Google Inc., Mountain View, CA (US)

(72) Inventors: Wan Fen Nicole Quah, Cambridge, MA (US); Bryan Horling, Belmont, MA (US); Maryam Garrett, Cambridge, MA (US); Brian Roark, Portland, OR (US); Richard Sproat, Hamilton, NJ (US)

(73) Assignee: GOOGLE LLC, Mountain View, CA (US)

( * ) Notice: Subject to any disclaimer, the term of this patent is extended or adjusted under 35 U.S.C. 154(b) by 282 days.

(21) Appl. No.: 15/157,293

(22) Filed: May 17, 2016

(65) Prior Publication Data

US 2017/0337184 A1 Nov. 23, 2017

(51) Int. Cl.
G06F 17/27 (2006.01)
G06F 17/28 (2006.01)
(Continued)

(52) U.S. Cl.
CPC .......... *G06F 17/28* (2013.01); *G06F 17/2264* (2013.01); *G06F 17/2785* (2013.01);
(Continued)

(58) Field of Classification Search
CPC combination set(s) only.
See application file for complete search history.

(56) References Cited

U.S. PATENT DOCUMENTS 8,321,201 B1   11/2012  Baker et al.
2013/0007033 A1  1/2013  Brown et al.
(Continued)

FOREIGN PATENT DOCUMENTS

KR   20160029587 A   3/2016

OTHER PUBLICATIONS

Henriquez, et al., "A N-gram-based Statistical Machine Translation Approach for Text Normalization on Chatspeak Style Communications." CAW2 (Content Analysis in Web 2.0), Apr. 21, 2009; 5 pages.

(Continued)

*Primary Examiner* — Vu B Hang
(74) *Attorney, Agent, or Firm* — Middleton Reutlinger (57) ABSTRACT

Some implementations are directed to translating chatspeak to a normalized form, where the chatspeak is included in natural language input formulated by a user via a user interface input device of a computing device—such as input provided by the user to an automated assistant. The normalized form of the chatspeak may be utilized by the automated assistant in determining reply content that is responsive to the natural language input, and that reply content may be presented to the user via one or more user interface output devices of the computing device of the user. Some implementations are additionally and/or alternatively directed to providing, for presentation to a user, natural language output that includes chatspeak in lieu of a normalized form of the chatspeak, based at least in part on a "chatspeak measure" that is determined based on past usage of chatspeak by the user and/or by additional users.

10 Claims, 7 Drawing Sheets

(51) Int. Cl.
    *G06F 17/22* (2006.01)
    *G06F 17/30* (2006.01)
    *H04L 12/58* (2006.01)

(52) U.S. Cl.
    CPC .... *G06F 17/2881* (2013.01); *G06F 17/30616* (2013.01); *H04L 51/04* (2013.01); *H04L 51/046* (2013.01); *H04L 51/16* (2013.01); *G06F 17/277* (2013.01); *G06F 17/2755* (2013.01)

(56) References Cited

U.S. PATENT DOCUMENTS

| | | |
|---|---|---|
| 2016/0072940 A1 | 3/2016 | Cronin |
| 2016/0103873 A1 | 4/2016 | Allen et al. |
| 2016/0132590 A1 | 5/2016 | Byron et al. |

OTHER PUBLICATIONS

International Search Report and Written Opinion of PCT Ser. No. PCT/US16/68738 dated Apr. 13, 2017.
The Korean Intellectual Property Office; Office Action issued in Application No. 10-2018-7036264 dated Feb. 7, 2019.

GENERATING OUTPUT FOR PRESENTATION IN RESPONSE TO USER INTERFACE INPUT, WHERE THE INPUT AND/OR THE OUTPUT INCLUDE CHATSPEAK

BACKGROUND

Multiple users may communicate with each other textually via message exchange threads that may be implemented using various technologies, such as text message exchanges, online chat (e.g., instant messenger, Internet relay chat, etc.), social network threads, and so forth. Many user will utilize so-called "chatspeak" in various communications with other users via a message exchange thread, particularly when utilizing mobile computing devices. Chatspeak may take various forms such as initialisations (e.g., acronyms and/or abbreviations composed of initials of multiple words (e.g., LOL for "laugh out loud")), removal of characters from words (e.g., "rvw" for "review"; "rlly" for "really"), addition of characters to words (e.g., "hellooooooooo" for "hello", "yeeesssss" for "yes"), representations of a word using one or more characters that may not appear in the word (e.g., "c" for "see", "thx" for "thanks").

SUMMARY

Some implementations of this specification are directed to translating chatspeak to a normalized form, where the chatspeak is included in natural language input formulated by a user via a user interface input device of a computing device—such as natural language input provided by the user to an automated assistant. The normalized form of the chatspeak may be utilized by the automated assistant in determining reply content that is responsive to the natural language input, and that reply content may be presented to the user via one or more user interface output devices of the computing device of the user. In many implementations, the natural language input that includes chatspeak may be formulated by the user as part of a message exchange thread between the user, the automated assistant, and optionally one or more additional users. In some of those implementations, the response that is generated by the automated system based on the normalized form of the chatspeak may be incorporated into the message exchange thread. For example, the response may be inserted into a transcript of the message exchange thread that is displayed in a graphical user interface of a message exchange client operating on the computing device of the user.

As one example, some implementations of this specification may be utilized to translate natural language input of "c u l8er" to the normalized form of "see you later", and the normalized form may be used by an automated system to determine reply content that is an appropriate "chat response" such as "see you then", "OK", etc. As another example, some implementations may be utilized to determine that natural language input that consists of only "thx" should be translated to the normalized form "thanks" for use by the automated assistant, whereas it may not be appropriate for the automated assistant to utilize a normalized form in other natural language input that includes "thx" along with one or more certain terms. For instance, in natural language input that includes "thx company", "thx" may not be translated to "thanks". Instead, the automated system may utilize "thx" to determine an appropriate response to "thx company", such as a "search response" that includes content related to the audio/video company THX.

Some implementations of this specification are additionally and/or alternatively directed to providing, for presentation to a user, natural language output that includes chatspeak in lieu of a normalized form of the chatspeak, based at least in part on a "chatspeak measure" that is determined based on past usage of chatspeak by the user and/or by additional users. For example, past instances of chatspeak translation for a user may be stored and a chatspeak measure determined based at least in part on a quantity of those instances (e.g., based on a raw count, a frequency, and/or other function of the quantity). For instance, where a user consistently uses chatspeak in messages provided to an automated assistant, that user's chatspeak measure may indicate a desire of that user to receive responses from the automated assistant that also include chatspeak, and the automated assistant may provide at least some responses that include chatspeak terms in lieu of normalized versions of those terms. A chatspeak measure may be a "general" chatspeak measure or applicable to a group of one or more specific chatspeak terms. For instance, a chatspeak measure of a user for "thx"/"thanks" may cause an automated assistant to replace "thanks" with "thx" in responses to that user, whereas a separate chatspeak measure of the user for "gr8"/ "great" (or a lack of a chatspeak measure for "gr8"/"great" may not cause the automated assistant to replace "great" with "gr8" in responses to that user.

In some implementations, at least one of one or more chatspeak measures utilized in determining whether to incorporate chatspeak in a given response to a given user may be a measure that is specific to the given user. For example, it may be determined based at least in part on instances of chatspeak in messages formulated by that user, such as instances of chatspeak recognized according to the techniques described herein. In some of those implementations, a chatspeak measure specific to a user may be specific to one or more devices of the user. For example, a first chatspeak measure may be assigned to the user for a mobile computing device of the user and a second chatspeak measure may be assigned to a "desktop" computing device of the user. In some implementations, at least one of one or more chatspeak measures utilized in determining whether to incorporate chatspeak in a given response to a given user may be based on chatspeak instances of a plurality of users. For example, it may be specific to a group of users, such as users having one or more attributes in common (e.g., a geographic region, an age range) and/or may be specific to a type of computing device utilized and/or a type of message exchange client utilized (e.g., among multiple users message exchange client A may have a greater frequency of chatspeak than client B).

Natural language input of a user may be received and processed in various scenarios and/or natural language output generated by an automated system may be generated in various scenarios. For example, natural language input may be input provided by the user during communication with one or more other users, such as communication via chat, SMS, and/or via other message exchange. As another example, the natural language input may be provided to an automated assistant that engages in dialog with the user via one or more user interface input and output devices. For example, the automated assistant may be integrated, in whole or in part, in a computing device of the user (e.g., a mobile phone, a tablet, a device devoted solely to the automated assistant functionality) and may include one or more user interface input devices (e.g., a microphone, a touch-screen) and one or more user interface output devices (e.g., a speaker, a display screen). Also, for example, the automated assistant may be implemented, in whole or in part, in one or more computing devices that are separate from, but in communication with, a client computing device of the user.

In some implementations, a method performed by one or more processors is provided that includes determining a chatspeak measure for one or more users based on a plurality of messages contributed to message exchange threads by one or more of the users. The method further includes receiving natural language input submitted by a user of the users as part of an ongoing message exchange thread between at least the user and an automated assistant. The natural language input is formulated by the user via a user interface input device of a computing device of the user. The method further includes generating natural language output for inclusion in a response of the automated assistant to the natural language input. Generating the natural language output comprises incorporating one or more chatspeak terms into the natural language output based on the chatspeak measure. The method further includes incorporating the response of the automated assistant into the message exchange thread, where the response includes the natural language output with the one or more chatspeak terms.

This method and other implementations of technology disclosed herein may each optionally include one or more of the following features.

In some implementations, incorporating the response into the message exchange thread includes inserting the response into a transcript of the message exchange thread that is displayed in a graphical user interface of a message exchange client operating on the computing device of the user.

In some implementations, the chatspeak measure is specific to a group of one or more chatspeak terms that includes at least the chatspeak terms included in the natural language output, and incorporating the one or more chatspeak terms into the natural language output is based on the chatspeak measure being specific to the group that includes the chatspeak terms.

In some implementations, incorporating the chatspeak terms into the natural language output includes: identifying initial natural language output that is responsive to the natural language input; determining that one or more given terms of the initial natural language output map to the chatspeak terms; and replacing the given terms of the initial natural language output with the chatspeak terms.

In some implementations, the method further includes determining an additional chatspeak measure for one or more of the users, and generating the natural language output includes incorporating one or more of the chatspeak terms into the natural language output based on the chatspeak measure and based on the additional chatspeak measure. In some of those implementations, the chatspeak measure is specific to the user and is applicable to a plurality of chatspeak terms, including one or more additional chatspeak terms not incorporated into the natural language output. In some version of those implementations, the additional chatspeak measure is not specific to the user and is specific to at least one of the chatspeak terms incorporated into the natural language output.

In some implementations, the chatspeak measure is specific to the user. In some of those implementations, the message exchange threads include past automated assistant message exchange threads between at least the user and the automated assistant. In some versions of those implementations, determining the chatspeak measure is based on a count of instances where chatspeak was utilized in the messages and the method further includes determining one of the instances on which the count is based. Determining the one of the instances may include: receiving a given message of the messages in one of the past automated assistant message exchange threads, the given message being formulated by the user and including at least a first term and a second term; identifying, for at least the first term of the natural language input, a first normalization of the first term; generating a candidate alternate input for the natural language input, the generating comprising replacing the first term with the first normalization and including, in the candidate alternate input, either the second term or a second normalization of the second term; determining a first score for the natural language input; determining a second score for the candidate alternate input; selecting the candidate alternate input based on the first score and the second score; determining reply content based on the candidate alternate input; incorporating the reply content into the one of the past automated assistant message exchange threads as a response to the natural language input by the automated assistant, wherein incorporating the reply content is based on selecting the candidate alternate input; and storing an indication of the one of the instances based on selecting the candidate alternate input. In some further versions of those implementations, determining the first score for the natural language input is based on applying at least the first term and the second term to a language model and determining the second score for the candidate alternate input based on applying at least the first normalization and either the second term or the second normalization to the language model. In yet further versions of those implementations, the chatspeak measure is specific to the user and is specific to the chatspeak terms; and storing the indication of the one of the instances based on selecting the candidate alternate input further includes: storing an association of the indication to at least the first term or the first normalization.

In some implementations, determining the chatspeak measure is based on a count of instances where chatspeak was utilized in the messages, a quality of one or more chatspeak terms used in the messages, commonness of the chatspeak terms, and/or consistency of use of the chatspeak terms.

In some implementations, a method performed by one or more processors is provided that includes receiving natural language input submitted by a user as part of a message exchange thread between at least the user and an automated assistant. The natural language input includes at least a first term and a second term, and is formulated by the user via a user interface input device of a computing device of the user. The method further includes: identifying, for at least the first term of the natural language input, a first normalization of the first term; and generating a candidate alternate input for the natural language input. Generating the candidate alternate input includes replacing the first term with the first normalization and including, in the candidate alternate input, either the second term or a second normalization of the second term. The method further includes: determining a first score for the natural language input based on applying at least the first term and the second term to a language model; determining a second score for the candidate alternate input based on applying at least the first normalization and either the second term or the second normalization to the language model; selecting the candidate alternate input based on the first score and the second score; determining reply content based on the candidate alternate input; and incorporating the reply content into the message exchange thread as a response to the natural language input by the automated assistant. Incorporating the reply content into the message exchange thread is based on selecting the candidate alternate input.

This method and other implementations of technology disclosed herein may each optionally include one or more of the following features.

In some implementations, incorporating the reply content into the message exchange thread includes inserting the reply content into a transcript of the message exchange thread that is displayed in a graphical user interface of a message exchange client operating on the computing device of the user.

In some implementations, the method further includes determining a reply content score for the reply content and determining the first score further based on the reply content score. In some of those implementations where a reply content score is determined, the reply content is a scripted response that is mapped to one or more input parameters and determining the reply content score is based on comparison of the candidate alternate input to at least some of the input parameters. In some of those implementations where a reply content score is determined, the reply content is based on one or more search results that are responsive to the candidate alternate input and determining the reply content score is based on a score or characteristic of at least one of the search results. In some versions of those implementations, determining the reply content score is based on the characteristic of at least one of the search results indicating that the search result is a certain type of search result.

In some implementations, the language model is an n-gram model and determining the first score for the natural language input based on applying at least the first term and the second term to the language model comprises applying both the first term and the second term to the language model.

In some implementations, the method further includes generating the language model based on normalizations of messages from message exchange threads between humans, wherein the normalizations of the messages replace chatspeak terms of those messages with normalized terms when those chatspeak terms are utilized as chatspeak.

In some implementations, determining the reply content based on the candidate alternate input comprises searching one or more reply resource databases based on the candidate alternate input.

In some implementations, a method performed by one or more processors is provided that includes receiving natural language input submitted by a user as part of a message exchange thread between at least the user and an automated assistant. The method further includes: identifying, for at least a first term of the natural language input, a first normalization of the first term; and generating a candidate alternate input for the natural language input. Generating the candidate alternate input includes including, in the candidate alternate input, the first normalization instead of the first term. The method further includes: determining a first score for the natural language input based on applying at least the first term to a language model; determining a second score for the candidate alternate input based on applying at least the first normalization to the language model; selecting the candidate alternate input based on the first score and the second score; determining reply content based on the candidate alternate input; and incorporating the reply content into the message exchange thread as a response to the natural language input by the automated assistant. Incorporating the reply content into the message exchange thread is based on selecting the candidate alternate input.

In addition, some implementations include one or more processors of one or more computing devices, where the one or more processors are operable to execute instructions stored in associated memory, and where the instructions are configured to cause performance of any of the aforementioned methods. Some implementations also include a non-transitory computer readable storage medium storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Users may desire to utilize chatspeak when submitting requests to various non-human computer systems, such as during a message exchange thread with an automated assistant. For example, users may be accustomed to utilizing chatspeak and/or constraints (e.g., display constraints, user interface input device constraints) of a computing device of the user may make it more desirable to utilize chatspeak. However, many computer systems may not recognize chatspeak, may not appropriately interpret chatspeak to a normalized form, and/or may erroneously interpret input as chatspeak even though that input was not intended as chatspeak. Also, many computer systems may not respond with chatspeak and/or may not respond with chatspeak based on past usage of chatspeak in message exchange threads by one or more users.

Implementations of this specification are directed to translating chatspeak to a normalized form, where the chatspeak is included in natural language input formulated by a user via a user interface input device of a computing device—such as natural language input provided by the user to an automated system. The normalized form of the chatspeak may be utilized by the automated system in determining reply content that is responsive to the natural language input, and that reply content may be presented to the user via one or more user interface output devices of the computing device of the user. As one example, some implementations of this specification may be utilized to translate natural language input of "c u l8er" to the normalized form of "see you later", and the normalized form may be used by an automated system to determine reply content that is an appropriate "chat response" such as "see you then", "OK", etc.

Some implementations of this specification are additionally and/or alternatively directed to providing, for presentation to a user, natural language output that includes chatspeak in lieu of a normalized form of the chatspeak, based at least in part on at least one chatspeak measure that is determined based on past usage of chatspeak by the user and/or by additional users. For example, past instances of chatspeak translation for a user may be stored and a chatspeak measure determined based on a quantity of those instances (e.g., based on a raw count, a frequency, and/or other function of the quantity). For instance, where a user consistently uses chatspeak in messages provided to an automated assistant, a chatspeak measure for that user may indicate a desire of that user to receive responses from the automated assistant that also include chatspeak (or certain specific chatspeak terms), and the automated assistant may provide at least some responses that include chatspeak terms in lieu of normalized versions of those terms. Other bases for determining a chatspeak measure include the quality (e.g., complexity) of the chatspeak terms used, commonness of the chatspeak terms used (e.g., it is common practice for others to make the substitution of the specific chatspeak for the normalized form, such as "lol" for "laugh out loud"), consistency of use by the user of the specific chatspeak (e.g., the user uses a specific chatspeak term a majority of the time in place of the normalized form), and so on. Indeed, the chatspeak measure may be determined from a combination (weighted or otherwise) of these attributes for general responses including chatspeak and/or the use of specific chatspeak terms in responses.

Figure 1:
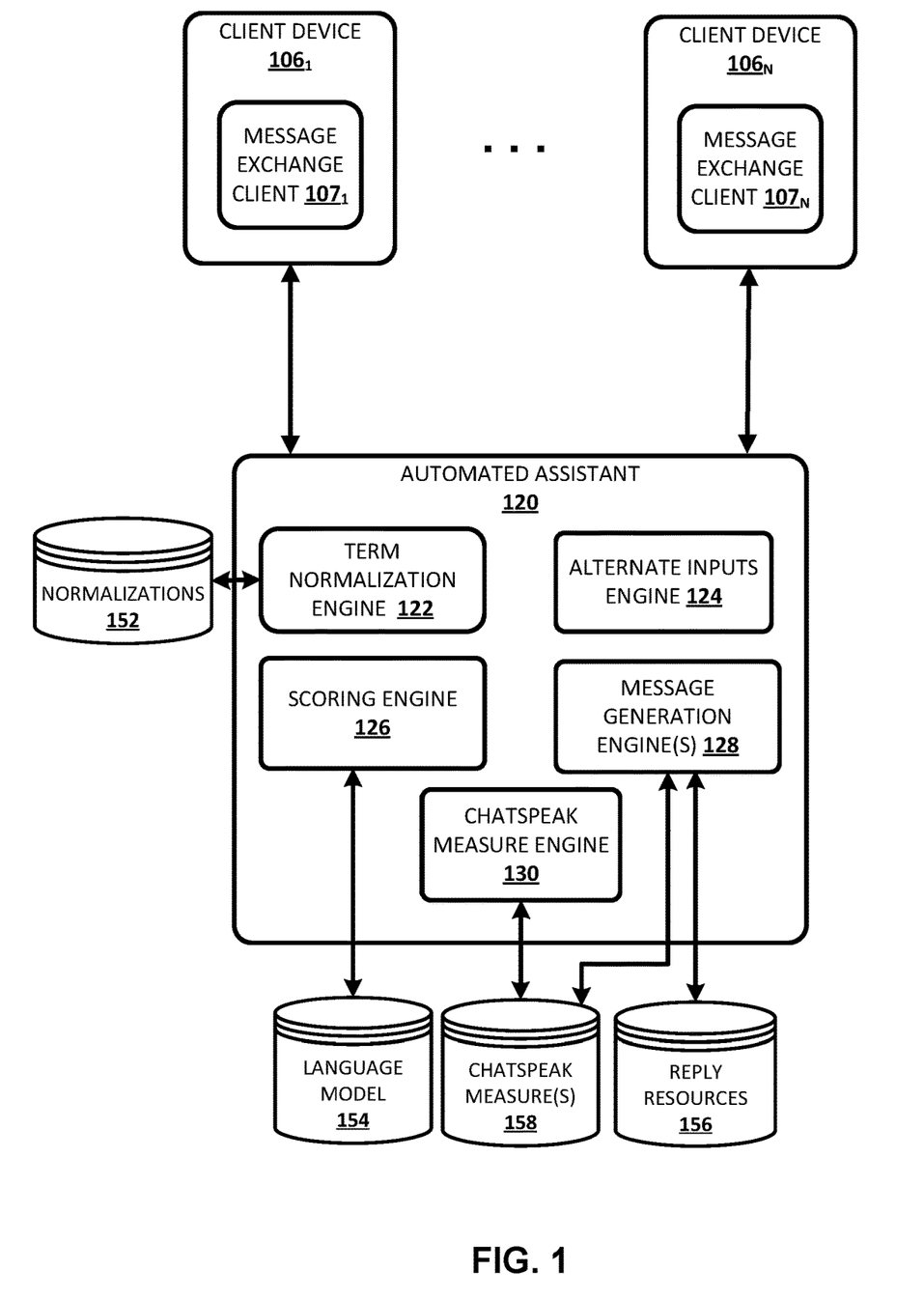
FIG. 1 is a diagram of an example environment in which implementations disclosed herein may be implemented.

Now turning to FIG. 1, an example environment in which techniques disclosed herein may be implemented is illustrated. The example environment includes a plurality of client computing devices $106_{1-N}$ and an automated assistant 120. Although automated assistant 120 is illustrated in FIG. 1 as separate from the client computing devices $106_{1-N}$, in some implementations all or aspects of the automated assistant 120 may be implemented by one or more of the client computing devices $106_{1-N}$. For example, client computing device $106_1$ may implement one instance or more aspects of automated assistant 120 and client computing device $106_N$ may also implement a separate instance of those one or more aspects of automated assistant 120. In implementations where one or more aspects of automated assistant 120 are implemented by one or more computing devices remote from client computing devices $106_{1-N}$, the client computing devices $106_{1-N}$ and those aspects of automated assistant 120 may communicate via one or more networks such as a local area network (LAN) and/or wide area network (WAN) (e.g., the Internet).

The client computing devices $106_{1-N}$ may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a personal assistant computing device, or a wearable apparatus of the user that includes a computing device (e.g., a watch of the user having a computing device, glasses of the user having a computing device, a virtual or augmented reality computing device). Additional and/or alternative client computing devices may be provided. In some implementations, a given user may communicate with automated assistant 120 utilizing a plurality of client computing devices of the user that collectively form a coordinated "ecosystem" of computing devices. However, for the sake of brevity, many examples described in this disclosure will focus on a given user operating a single one of the client computing devices $106_{1-N}$.

Each of the client computing devices $106_{1-N}$ may operate a variety of different applications, such as a corresponding one of the message exchange clients $107_{1-N}$. Message exchange clients $107_{1-N}$ may come in various forms and the forms may vary across the client computing devices $106_{1-N}$ and/or multiple forms may be operated on a single one of the client computing devices $106_{1-N}$. In some implementations, one or more of the message exchange clients $107_{1-N}$ may come in the form of a short messaging service ("SMS") and/or multimedia messaging service ("MMS") client, an online chat client (e.g., instant messenger, Internet relay chat, or "IRC," etc.), a messaging application associated with a social network, a personal assistant messaging service dedicated to dialog with automated assistant 120, and so forth. In some implementations, one or more of the message exchange clients $107_{1-N}$ may be implemented via a webpage or other resources rendered by a web browser (not depicted) or other application of client computing device 106.

As described in more detail herein, the automated assistant 120 receives input from, and/or provides output to, one or more users via user interface input and output devices of one or more client devices $106_{1-N}$. In some implementations, user interface input described herein is explicitly directed to the automated assistant 120. For example, one of the message exchange clients $107_{1-N}$ may be a personal assistant messaging service dedicated to conversations with automated assistant 120 and user interface input provided via that personal assistant messaging service may be automatically provided to automated assistant 120. Also, for example, the user interface input may be explicitly directed to the automated assistant 120 in one or more of the message exchange clients $107_{1-N}$ based on particular user interface input that indicates the automated assistant 120 is to be invoked. For instance, the particular user interface input may be one or more typed characters (e.g., @PersonalAssistant), user interaction with a virtual button (e.g., a tap, a long tap), a verbal command (e.g., "Hey Personal Assistant"), etc. In some implementations, the automated assistant 120 may perform one or more actions in response to user interface input, even when that user interface input is not explicitly directed to the automated assistant 120. For example, the automated assistant 120 may examine the contents of user interface input and perform one or more actions in response to certain terms being present in the user interface input and/or based on other cues.

Each of the client computing devices $106_{1-N}$ and automated assistant 120 may include one or more memories for storage of data and software applications, one or more processors for accessing data and executing applications, and other components that facilitate communication over a network. The operations performed by one or more of the client computing devices $106_{1-N}$ and/or by the automated assistant 120 may be distributed across multiple computer systems. Automated assistant 120 may be implemented as, for example, computer programs running on one or more computers in one or more locations that are coupled to each other through a network.

Automated assistant 120 may include a term normalization engine 122, an alternate inputs engine 124, a scoring engine 126, one or more message generation engines 128, and a chatspeak measure engine 130. In some implementations, one or more of engines 122, 124, 126, 128, and/or 130 may be omitted. In some implementations, all or aspects of one or more of engines 122, 124, 126, 128, and/or 130 may be combined. In some implementations, one or more of engines 122, 124, 126, 128, and/or 130 may be implemented in a component that is separate from automated assistant 120. For example, one or more of engines 122, 124, 126, 128, and/or 130, or any operative portion thereof, may be implemented in a component that is executed by one of the client computing devices $106_{1-N}$.

In FIG. 1, the automated assistant 120 is illustrated in communication with normalizations database 152, language model database 154, reply resources database 156, and chatspeak measures database 158. The databases 152, 154, 156, and/or 158 are described in more detail below and may be provided on one or more non-transitory computer readable media, such as one or more media that are local to one of the client computing devices $106_{1-N}$, local to the automated assistant 120, and/or remote from the client computing devices $106_{1-N}$ and/or the automated assistant 120. In many implementations, one or more of the databases 152, 154, 156, and/or 158 may be combined.

The term normalization engine 122 determines normalizations of various potential chatspeak terms in received natural language input. For example, the term normalization engine 122 may determine a normalization of "see" for the term "c", a normalization of "thanks" for the term "thx", normalizations of "review" and "rearview" for the term "rvw", etc. The term normalization engine 122 may utilize one or more mappings, rules, and/or other criteria of normalizations database 152 to generate the normalizations. For example, normalizations database 152 may include mappings of certain chatspeak terms to one or more of their corresponding normalizations. For instance, the term "c" may be mapped to a single normalization of "see", the term "rvw" may be mapped to multiple normalizations such as "review", "rearview", etc. Also, for example, normalizations database 152 may define a rule that dictates that in terms that contain multiple consecutive instances of the same character and that are not a valid normalized term, instances of that character can be removed until a valid normalized term is achieved. For instance, the rule can be utilized to normalize "helloooooooo" to "hello", to normalize "yessss" to "yes", to normalize "yippeeeeeeeee" to "yippee", to normalize "cooooolllll" to "cool" and "col", etc. In some implementations, the term normalization engine 122 may compose mappings and/or rules in determining a normalization. For example, engine 122 can normalize "wazzaaaaa" to "what's up" by first deduplicating "wazzaaaaa" to "wazza" and the identifying a mapping between "wazza" and "what's up". In deduplicating "wazzaaaaa" to "what's up", the engine 122 may rely on a rule that dictates that in terms that contain multiple consecutive instances of the same character and that are not a valid normalized term, instances of that character can be removed until a recognized term is achieved (e.g., a term that is recognized in a mapping between chatspeak terms and normalized terms).

The alternate inputs engine 124 generates candidate alternate inputs for a received natural language input and generates each of the candidate alternate inputs by replacing one or more terms of the received natural language input with one of its normalizations (if any). For example, for the received natural language input of "tx 4 the rvw", term normalization engine 122 may normalize "tx" to thanks, may normalize "4" to "for", and may normalize "rvw" to "review" and "rearview". Based on those normalizations, the alternate inputs engine may generate candidate alternate inputs of "thanks 4 the review", "tx for the review", "thanks 4 the rearview", "thanks for the rearview", "thanks for the review", "tx 4 the review", and "tx 4 the rearview".

The scoring engine 126 generates a score for each of the alternate inputs generated by the alternate inputs engine 124, and optionally for the natural language input based on which the alternate inputs were generated. The scoring engine 126 utilizes the scores to select at least one of those as a selected input to be used by the message generation engine 128 in generating a response to the received natural language input.

In various implementations, the scoring engine 126 utilizes a language model 154 to determine the score. In some of those implementations, the language model 154 is an n-gram language model trained on a corpus of messages and/or other content that includes "normalized" (i.e., non-chatspeak) terms. For example, the language model 154 may be utilized to determine a score for "see you later" that indicates "see" "you", and "later" are more likely to co-occur (in the corpus used to train the language model 154) than are the terms of "see", "u" and "l8r". Compare this to natural language input of "thx audio company" and an alternate input of "thanks audio company". In such a situation, the language model 154 may be utilized to determine "thx", "company", and "audio" are more likely to co-occur than are "thanks", "audio", and "company" (and thus determine a better score for "thx audio company"). In some implementations, the scoring engine 126 determines, for a given input (the received natural language input and/or an alternate input), a score for the given input based on the language model 154 utilizing terms of that input and without reference to terms of a prior input provided by the user to the automated assistant 120 and/or terms of a prior output provided by the automated assistant 120 for presentation to the user. In some other implementations, the scoring engine 126 may also utilize one or more of the terms of a prior input (e.g., the immediately prior input) and/or of a prior output (e.g., the immediately prior output).

As mentioned above, in some implementations the language model 154 may be trained based on a corpus of messages and/or other content that includes "normalized" terms. For example, the corpus of messages may include messages exchanged between two or more human users, with chatspeak terms of those messages transformed to normalized versions by one or more human reviewers and/or an automated system. For example, in a message that includes "thanks 4 your help", the term "4" may be normalized to "for" and the message that includes "for" instead of "4" utilized to train the language model 154. On the other hand, in a message that includes "4×4 truck", the two occurrence of the term "4" would not be replaced with "for", and the message that includes "4×4 truck" may also be utilized to train the language model 154. In other words, in those implementations the language model 154 may be trained based on messages with potential chatspeak terms replaced with their normalized versions when those terms are utilized in a chatspeak manner—but with those potential chatspeak terms maintained when they are utilized in a non-chatspeak manner. Additional and/or alternative corpora may be utilized to train the language model 154 in various implementations, such as web pages, news stories, academic articles, patent application publications, user Internet comments provided to comment on Internet content such as videos, etc.

In some implementations of determining scores, the scoring engine 126 additionally and/or alternatively utilizes one or more additional scores, such as one or more reply content scores from one or more of the message generation engines 128 and/or one or more rewrite scores from a rewrite engine (not depicted). In some of those implementations, the scoring engine 126 utilizes the reply content score(s) from message generation engine(s) 128 (and/or other additional score(s)) when there is not sufficient variation between two or more of the scores determined based on the language model 154. In some other implementations, the scoring engine 126 may always utilize the reply content score(s) from message generation engine(s) 128 (and/or other additional score(s)) as part of the score determination for one or more inputs being analyzed, an optionally utilizes the reply content score(s) in combination with score(s) determined based on the language model 154.

Generally, the reply content score provided by one of the message generation engines 128 for an input (the original natural language input or an alternate input) indicates how "good" a response is that is generated by that engine 128 based on that input. For example, one of the engines 128 may provide "chat responses" and may provide a reply content score indicative of a good response if there is a scripted response that correlates strongly to the input. For instance, the reply resources database 156 may include one or more scripted chat responses that are each mapped to one or more input parameters that indicate when the scripted response is appropriate—and the reply content score for a given input may be determined based on comparison of the given input to the input parameter(s). Also, for example, one of the engines 128 may provide content from "search results" and may provide a reply content score for a given input that is indicative of a good response if at least one search result for the given input is a high quality search result and/or of a particular "type" (e.g., a "one box result", a "knowledge card", a "curated response").

As one example, assume received natural language input of "thx audio" and that alternate inputs engine 124 generated an alternate input of "thanks audio". Further assume scoring engine 126 generates scores for those inputs that are based on the language model 154, but those scores are too close to one another to warrant selecting one over the other (e.g., a better score fails to satisfy a threshold relative to the other score). In such an example, one of the message generation engines 128 may provide content from "search results" and may provide a reply content score for "thx audio" that is much more indicative of a good response than a separate reply content score for "thanks audio." The scoring engine 126 may select "thx audio" over "thanks audio" based at least in part on those reply content scores.

As another example, assume received natural language input of "thx 4 assistance" and that alternate inputs engine 124 generated an alternate input of "thanks for assistance". Further assume scoring engine 126 generates scores for those inputs that are based on the language model 154, but those scores are too close to one another to warrant selecting one over the other. In such an example, one of the message generation engines 128 may provide content from scripted responses and may include a scripted response of "you're welcome" that is associated, in reply resources database 156, with input parameters of "thanks for the [help/assistance/input/info/information/etc.]", where the brackets "[ ]" and terms within the brackets indicate a plurality of terms, any of which could be paired with "thanks for the". Based on the strong degree of conformity between "thanks for assistance" and the input parameters of the scripted response of "you're welcome", that message generation engine 128 could provide a reply content score for "thanks for assistance" that is much more indicative of a good response than a separate reply content score from that engine 128 for "thx 4 assistance". The scoring engine 126 may select "thanks for assistance" over "thx 4 assistance" based at least in part on those reply content scores.

Generally, the rewrite score provided by a rewrite engine for an input (the original natural language input or an alternate input) indicates how "good" a rewrite of that input is, where the rewrite is generated by the rewrite engine based on that input and optionally based on one or more prior inputs (or selected alternate inputs of those prior inputs). How good a rewrite is may be based on characteristic(s) of the rewrite itself (e.g., is it syntactically correct) and/or properties of search result(s) that are responsive to the rewrite. As one example, assume a prior input of "what's the weather on Saturday", a current input of "what abt sun", and candidate alternate inputs that include "what about Sunday". A rewrite of "what abt" sun that is based on the prior input may be "what's the weather on the Sun", whereas a rewrite of "what about Sunday" may be "what's the weather on Sunday". The rewrite score for "what about Sunday" may be better than the rewrite score for "what about sun" based on, for example, one or more properties of search results that are responsive to those rewrites.

Regardless of the technique(s) utilized, the scoring engine 126 may provide the selected input to the message generation engine(s) 128, which may utilize reply resources database 156 to generate reply content that is responsive to the selected input. In some implementations, the message generation engine(s) 128 may have already generated the reply content prior to receiving the selected input. For example, the reply content may have been generated during generation of a reply content score as described above. The generated reply content is provided to the message exchange client $107_{1-N}$ that provided the natural language input, and is provided for presentation to the user as a response to that natural language input. For example, the reply content may be incorporated by the message exchange client into a message exchange thread that also includes the natural language input.

The chatspeak measure engine 130 determines chatspeak measure(s) for one or more users based on past usage of chatspeak in a plurality of messages contributed to message exchange threads by one or more of the users. The chatspeak measure engine 130 stores determined chatspeak measure(s) in chatspeak measure(s) database 158 for utilization by one or more of the message generation engines 128. The message generation engines 128 may utilize chatspeak measure(s) that are applicable to a user in determining whether to include chatspeak term(s), in lieu of their normalized terms, in reply content they generate in response to natural language input of the user (optionally regardless of whether that natural language input itself includes any chatspeak terms).

In some implementations, the chatspeak measure engine 130 determines a chatspeak measure based on a count of instances where chatspeak was utilized messages. For example, the chatspeak measure engine 130 may determine a "general" chatspeak measure (for a user or a group of users) as a function of the count of the messages (of the user of the group of users) that include any chatspeak as compared to the count of the messages that do not include any chatspeak. Also, for example, the chatspeak measure engine 130 may additionally and/or alternatively determine a "general" chatspeak measure (for a user or a group of users) as a function of a count of terms in the messages (of the user of the group of users) that are chatspeak terms as compared to a total count of terms in the messages.

As one example, past instances of chatspeak translation for a user may be stored and a chatspeak measure determined based on a quantity of those instances (e.g., based on a raw count, a frequency, and/or other function of the quantity). For instance, where a user consistently uses chatspeak in messages provided to an automated assistant, a chatspeak measure for that user may indicate a desire of that user to receive responses from the automated assistant that also include chatspeak, and the automated assistant may provide at least some responses that include chatspeak terms in lieu of normalized versions of those terms. The chatspeak measure may be a "general" chatspeak measure or applicable to a group of one or more specific chatspeak terms. For instance, a chatspeak measure of a user for "thx"/"thanks" may cause an automated assistant to replace "thanks" with "thx" in responses to that user, whereas a separate chatspeak measure of the user for "gr8/great" may not cause the automated assistant to replace "great" with "great" in responses to that user.

In some implementations, the chatspeak measure may be specific to a given user. For example, it may be determined based at least in part on instances of chatspeak in messages formulated by that user, such as instances recognized according to the techniques described herein. In some of those implementations, the chatspeak measure may be specific to one or more devices of the user (e.g., the user may be more likely to utilize chatspeak on a mobile computing device vs. a "desktop" computing device). In some implementations, the chatspeak measure may be based on chatspeak instances of a plurality of users and may be specific to a group of users such as users having one or more attributes in common (e.g., a geographic region, an age range) and/or may be specific to a type of computing device utilized and/or a type of message exchange client utilized (e.g., message exchange client A may have a greater frequency of chatspeak than client B among multiple users). In some implementations, a given user may be presented with an option to explicitly request that the automated assistant 120 include chatspeak in output provided to the user, such as chatspeak that includes chatspeak terms associated with at least a threshold chatspeak measure for one or more groups of users. For instance, the user may opt to receive chatspeak terms in output, where those chatspeak terms are popular among people in a geographic region (e.g., those chatspeak terms associated with at least a threshold chatspeak measure for a group of users in the geographic region).

In some implementations, multiple chatspeak measures may be utilized by one of the message generation engine 128 in determining whether to utilize one or more chatspeak terms in lieu of normalized versions of those terms. For example, the message generation engine 128 may determine whether to utilize "c" in lieu of "see" in output to be provided to a user based on both: a general chatspeak measure of the user; and a chatspeak measure (of the user or of a group of users) that is specific to "c/see". For instance, assume the general chatspeak measure of the user indicates a "medium" degree of chatspeak utilization by the user. If the chatspeak measure that is specific to "c/see" indicates a high degree of chatspeak utilization in association with those terms, "c" may be utilized in lieu of "see" in generated output. On the other hand, if the chatspeak measure that is specific to "c/see" indicates a low degree of chatspeak utilization in association with those terms, "see" may be utilized in generated output.

Figure 2:
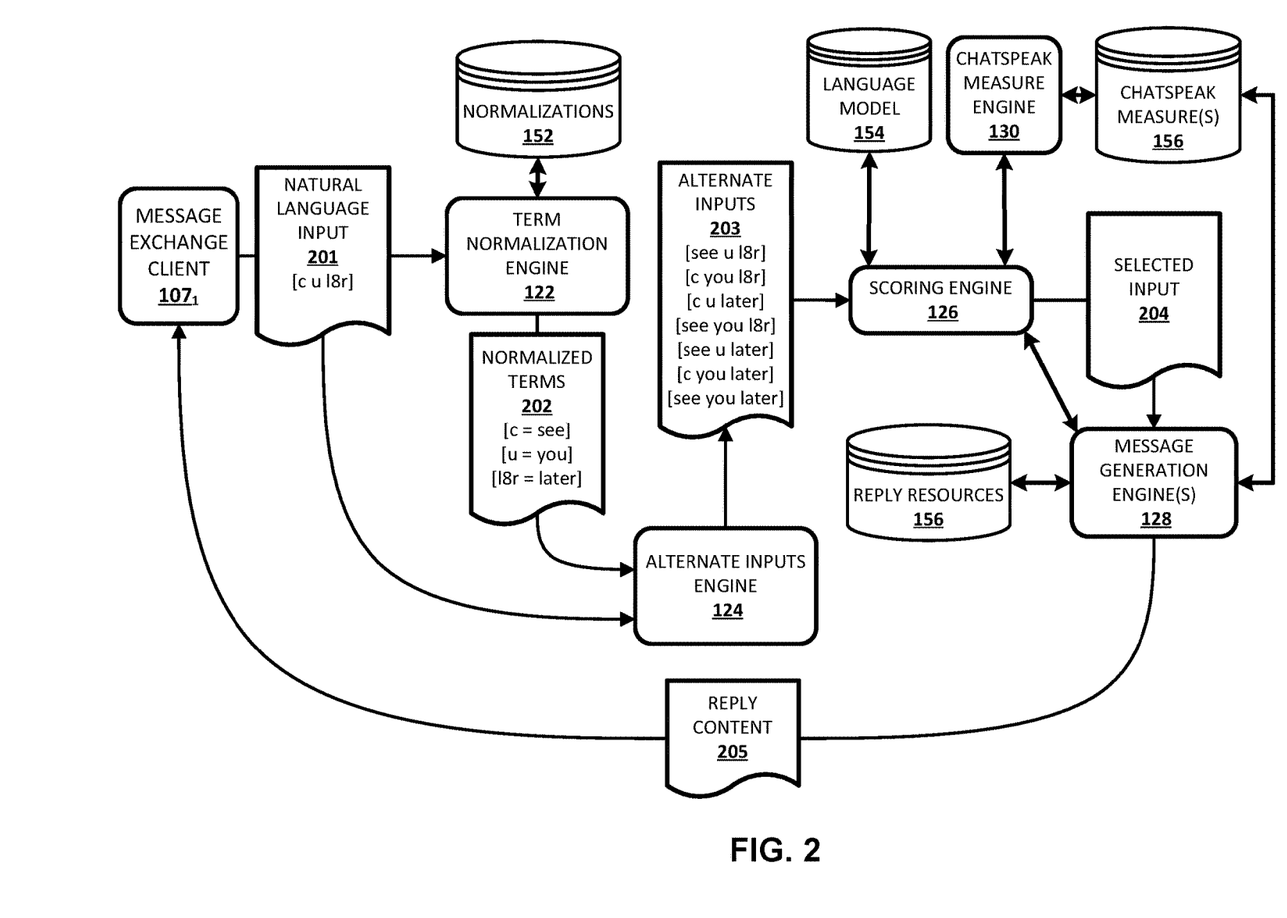
FIG. 2 illustrates an example of receiving natural language input that includes chatspeak, translating the chatspeak to a normalized form, utilizing the normalized form to generate reply content that is responsive to the natural language input, and providing that reply content for presentation as a response to the natural language input.

Turning now to FIG. 2, additional description is provided of various components of automated assistant 120. In FIG. 2, a user utilizes one or more user interface input devices of the computing device $106_1$ to provide natural language input 201 to message exchange client $107_1$, which transmits the natural language input 201 to the term normalization engine 122. The natural language input 201 may be free-from input and may be, for example, typed input provided by the user via a physical or virtual keyboard of a computing device or spoken input provided by the user to a microphone of the computing device. In implementations where the natural language input 201 is spoken input, it may optionally be transcribed to textual input by the computing device and/or by a component of the automated assistant 120.

As a working example, the natural language input 201 may be "c u l8r", which is also illustrated in FIG. 2 in brackets for ease in understanding the working example.

Term normalization engine 122 generates one or more normalizations for one or more of the terms of the natural language input 201, optionally based on one or more mappings, rules, and/or other criteria of normalizations database 152. The term normalization engine 122 provides the normalized terms 202 to alternate inputs engine 124.

Continuing with the working example, the term normalization engine 122 may generate normalized terms 202 where "c" has been normalized to "see", "u" has been normalized to "you", and "l8r" has been normalized to "later". The normalizations are illustrated in brackets in FIG. 2.

Alternate inputs engine 124 generates alternate inputs 203 of the natural language input 201 that each include at least one of the normalized terms 202 substituted for one of the terms of the natural language input 201.

Continuing with the working example, the alternate inputs 203 generated based on natural language input 201 of "c u l8r" and normalized terms of "see", "you", and "later", include "see u l8r, "c you l8r", "c u later", "see you l8r", "see u later", "c you later", and "see you later". These are also illustrated in brackets in FIG. 2.

The scoring engine 126 generates a score for each of the alternate inputs and optionally for the natural language input 201 and selects one or more (e.g., only one) of those as the selected input 204 based on the score. In various implementations, the scoring engine 126 utilizes a language model 154 to determine the scores. In some of those implementations, the language model 154 is an n-gram language model trained on a corpus of messages and/or other content that includes, is restricted to, or is dominated by "normalized" (i.e., non-chatspeak) terms.

Continuing with the working example, the language model 154 may be utilized to determine a score for "see you later" that indicates "see" "you", and "later" are more likely to co-occur (in the corpus used to train the language model 154) than are the terms of the other alternate inputs 203.

In some implementations of determining scores, the scoring engine 126 additionally and/or alternatively utilizes one or more reply content scores from one or more message generation engines 128. In some of those implementations, the scoring engine 126 utilizes the reply content scores from message generation engine(s) 128 when there is not sufficient variation between two or more of the scores determined based on the language model 154. Generally, the reply content score provided by one of the message generation engines 128 for an input (the original natural language input or an alternate input) indicates how "good" a response is that is generated by that engine 128 based on that input. For example, one of the engines 126 may provide "chat responses" and may provide a reply content score indicative of a good response if there is a scripted response that correlates strongly to the input. Also, for example, one of the engines 128 may provide content from "search results" and may provide a reply content score indicative of a good response if at least one search results for the input is a high quality search result and/or of a particular "type" (e.g., a "one box result", a "knowledge card", a "curated response").

Regardless of the technique(s) utilized, the scoring engine 126 provides the selected input 204 to the message generation engine(s) 128, which utilize reply resources database 156 to generate reply content 205 that is responsive to the selected input. The reply content 205 is provided to the message exchange client $107_1$ for audible and/or visual presentation to the user as a response to the natural language input 201. For example, the reply content 205 may be incorporated, by the message exchange client $107_1$, into a message exchange thread for simultaneous display with the natural language input 201 in the message exchange thread.

In FIG. 2, chatspeak measure engine 130 and chatspeak measure(s) database 156 are also illustrated. In some implementations, in response to determining a selected input 204 that includes a "translation" of one or more chatspeak terms to their normalized terms, the scoring engine 126 may provide, to chatspeak measure engine 130, an indication of the occurrence of the translation and/or an indication of the chatspeak terms that were translated and/or their normalized terms. As described herein, in some implementations that indication and/or additional indications may be utilized to determine a "chatspeak measure" for one or more users (and optionally for one or more particular chatspeak terms and/or their normalized terms). As also described herein, that chatspeak measure and/or additional chatspeak measures may be utilized by message generation engine(s) 128 to determine whether to include chatspeak term(s) in reply content 205 and/or in additional reply content in lieu of their normalized terms.

Continuing with the working example, the scoring engine 126 may provide a general indication to chatspeak measure engine 130 that a "translation" occurred in which natural language input that included chatspeak was translated to an alternate input. The general indication may be utilized by the chatspeak measure engine 130 to determine a general chatspeak measure for the user, for a group of users, and/or for other parameters. The scoring engine 126 may additionally and/or alternatively provide an indication to the chatspeak measure engine 130 of the chatspeak terms and/or the chatspeak phrases of the natural language input and the selected normalized versions of those chatspeak terms and/or of the chatspeak phrases. For example, where the input 201 is "c u l8r" and the selected input 204 is "see you later", the scoring engine 126 may provide the chatspeak measure engine 130 with indication(s) that chatspeak of "c" was normalized to "see", chatspeak of "u" was normalized to "you", chatspeak of "l8r" was normalized to "later", and/or chatspeak of "c u l8r" was normalized to "see you later". These indications may be utilized by chatspeak measure engine 130 to generate one or more chatspeak measures that are specific to those terms and/or to the phrase—and may optionally be further based on other instances of translation of those terms and/or the phrase by the user via the message exchange client $107_1$, via other message exchange clients, and/or via other applications.

The message generation engine(s) 128 may utilize chatspeak measure(s) of database 156 in determining whether to include chatspeak term(s) in reply content 205 and/or additional reply content. Continuing with the working example, assume the selected input 204 is "see you later" and one of the message generation engine(s) 128 determines, from reply resources database 156, a scripted response of "see you then" for the selected input 204. Based on one or more chatspeak measure(s) of database 156 that are applicable to the user of message exchange client $107_1$, the message generation engine 128 may replace "see" with "c", replace "you" with "u", and provide output of "c u then".

Figure 3:
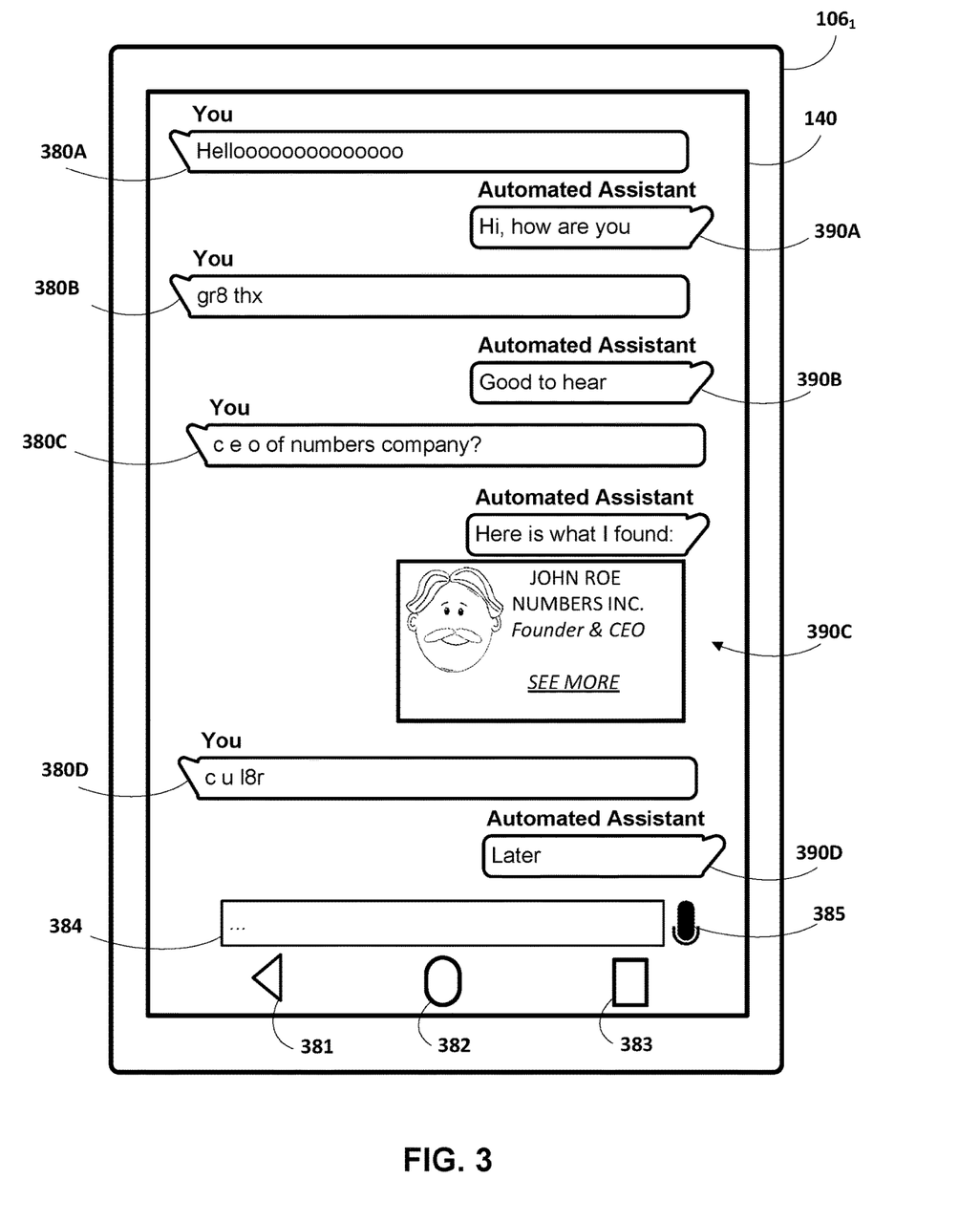
FIG. 3 illustrates an example client computing device with a display screen displaying an example of dialog that may occur between a user of the client computing device and an automated assistant according to implementations described herein.
Figure 4:
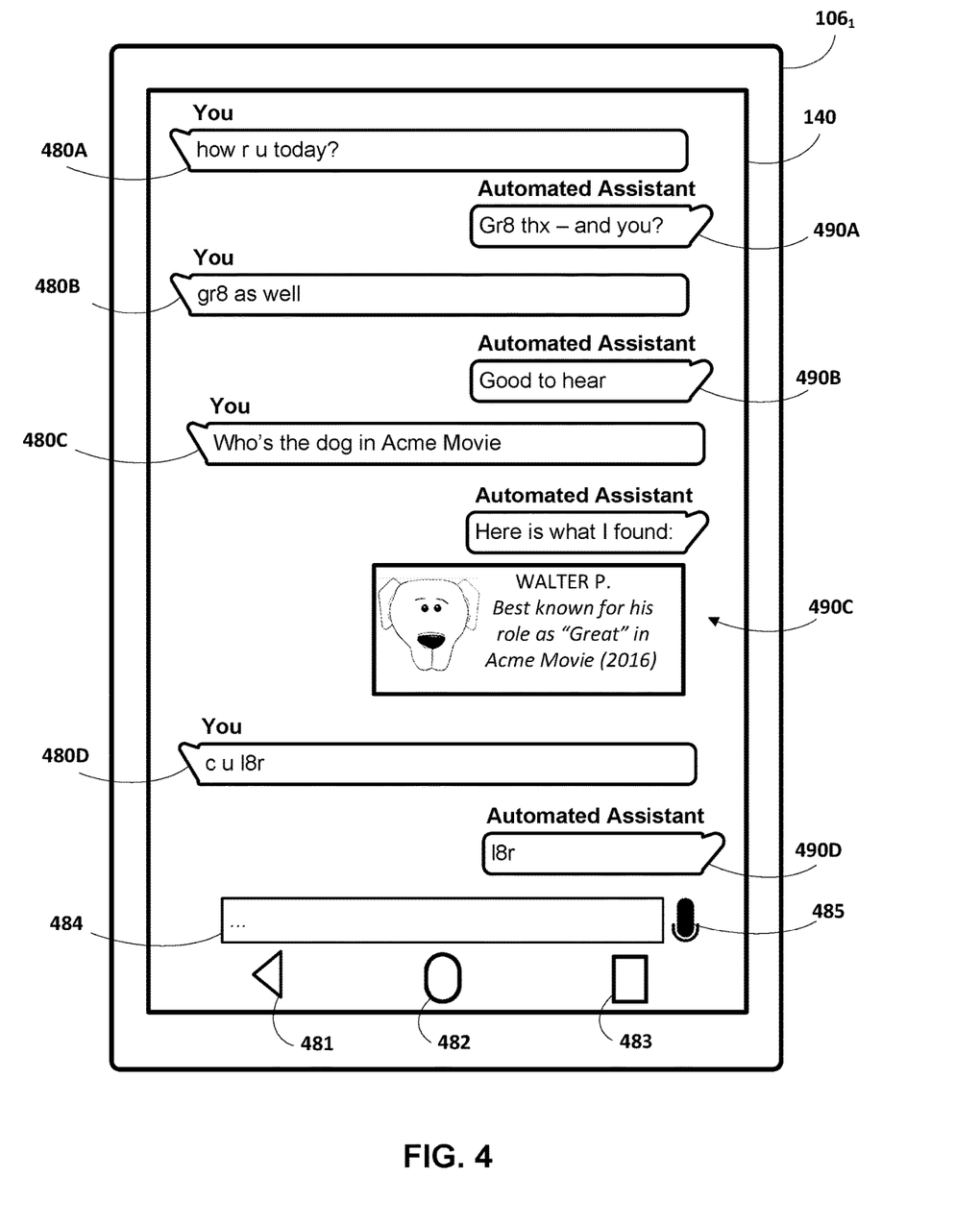
FIG. 4 illustrates an example client computing device with a display screen displaying an example of dialog that may occur between a user of the client computing device and an automated assistant according to implementations described herein.

Turning now to FIGS. 3 and 4, additional description is provided of various components and techniques described herein. FIGS. 3 and 4 each illustrate the client computing device $106_1$ of FIG. 1 with a display screen 140 displaying an example of dialog that may occur between a user of the client computing device $106_1$ and the automated assistant 120 according to implementations described herein. The display screen 140 also includes system interface elements 381, 382, 383 that may be interacted with by the user to cause the computing device $106_1$ to perform one or more actions. The display screen 140 further includes a textual reply interface element 384 that the user may select to generate natural language input via a virtual keyboard and a voice reply interface element 385 that the user may select to generate natural language input via a microphone.

FIG. 3 includes natural language inputs 380A-D that are submitted by a user via one or more user interface input devices of the client computing device $106_1$. FIG. 3 further includes responses 390A-390D that are generated by the automated assistant 120.

Input 380A of "Hellooooooooooooooo" may be normalized to "hello" by term normalization engine 122. Alternate inputs engine 124 may utilize "hello" as the alternate input. Scoring engine 126 may generate a first score for "Hellooooooooooooooo", a second score for "hello", select "hello" as the selected input based on the scores, and provide "hello" message generation engines 128. One of the message generation engines 128 may generate response 390A based on a chat response that is mapped or otherwise associated with "hello" in reply resources database 156.

"gr8" of input 380B may be normalized to "great" and "thx" of input 380B may be normalized to "thanks" by term normalization engine 122. Alternate inputs engine 124 may generate alternative inputs of "gr8 thanks", "great thx", and "great thanks". Scoring engine 126 may generate a score for the input 380B and for each of the alternate inputs. In some implementations, the score for "great thanks" may be generated based at least in part on a reply content score as described herein, and that reply content score may optionally be generated by one of the message generation engines 128 taking into account the previous response 390A and/or the previous input 380A. The scoring engine 126 selects "great thanks" as the selected input to provide to message generation engines 128. One of the message generation engines 128 may generate response 390B based on a chat response that is mapped or otherwise associated with "Good to hear" in reply resources database 156.

Input 380C is "c e o of numbers company?". Term normalization engine 122 may normalize "c" to "see", "e" to "enemy", and "o" to "oh" and "over". Alternate inputs engine 124 may generate alternative inputs of "see e o of numbers company?", "see enemy over numbers company?", and so forth. Scoring engine 126 may generate a score for the input 380C and for each of the alternate inputs. Based on the scores, the scoring engine 126 may select the input 380C of "c e o of numbers company?" to provide to the message generation engine(s) 128. One of the message generation engines 128 may generate response 390C based on a search result returned for the input 380C. The response 390C includes the text "Here's what I found:" to indicate that the content is responsive to the input 380C and includes a "card" focused on the fictional CEO of the fictional "Numbers Company". The card includes an image of the CEO, a name of the CEO, and a selectable option to see more information which, when selected, may present the user (within the message exchange client 107₁ or a separate application) with more information pertaining to the CEO.

Input 380D of "c u l8r" may be translated by automated assistant 120 to "see you later" and utilized to provide the scripted response 390D of "Later".

FIG. 4 includes natural language inputs 480A-D that are submitted by a user via one or more user interface input devices of the client computing device 106₁. FIG. 4 further includes responses 490A-490D that are generated by the automated assistant 120. The example of FIG. 4 illustrates, inter alia, how one or more message generation engines 128 may utilize chatspeak measure(s) associated with a user of the client computing device 106₁ to selectively incorporate chatspeak into generated responses 490A-490D.

The automated assistant 120 generates response 490A of "Gr8 thx—and you?" in response to input 480A of "how r u today?". The response 490A includes chatspeak terms "Gr8" and "thx" and may include those chatspeak terms based on a chatspeak measure as described herein. In some implementations, one of the message generation engines 128 may determine the response 490A based on it being indicated as a scripted chatspeak response to input 480A (or a translation of input 480A determined as described herein). In such an implementation, the message generation engine 128 may select the response 490A based on it being indicated as a "chatspeak" response and based on a chatspeak measure of the user that submitted the input 480A satisfying a threshold. In some implementations, one of the message generation engines 128 may determine the response 490A based on first determining "Great thanks—and you?" as a response to input 480A (or a translation of input 480A determined as described herein), and then replacing "Great" with "Gr8", "thanks" with "thx", but not replacing "you" with "u". For example, chatspeak measures of the user may indicate that the user typically utilizes "Gr8" and "thx" as chatspeak, but rarely (or never) utilizes "u" as chatspeak.

Input 480B of "gr8 as well" is responded to with the scripted response 490B of "Good to hear", which does not include any chatspeak terms. For example, one of the message generation engines 128 may determine the response 490B on it being indicated as a scripted chatspeak response to input 480B (or a translation of input 480B determined as described herein).

Input 480C of "Who's the dog in Acme Movie" is responded to with response 490C. One of the message generation engines 128 may generate response 490C based on a search result returned for the input 490C. The response 490C includes the text "Here's what I found:" to indicate that the content is responsive to the message 480C and includes a "card" focused on the fictional dog that acted in the fictional film "Acme Movie". The card includes an image of the dog, a "formal" name of the dog (WALTER P.), and includes additional information about the dog. It is noted that the additional information includes the dog's name of "Great" in his role in the fictional Acme Movie. It is further noted that the term "Great" is not translated in the additional information, even though it was in response 490A. This may be based on, for example, a rule to not utilize chatspeak terms in lieu of terms of certain responses, such as terms of responses generated based on a search result (e.g., as compared to responses generated based on a scripted response).

Input 480D of "c u l8r" is responded to with the response 490D of "l8r", which includes chatspeak terms and may be generated according to techniques described herein.

Figure 5:
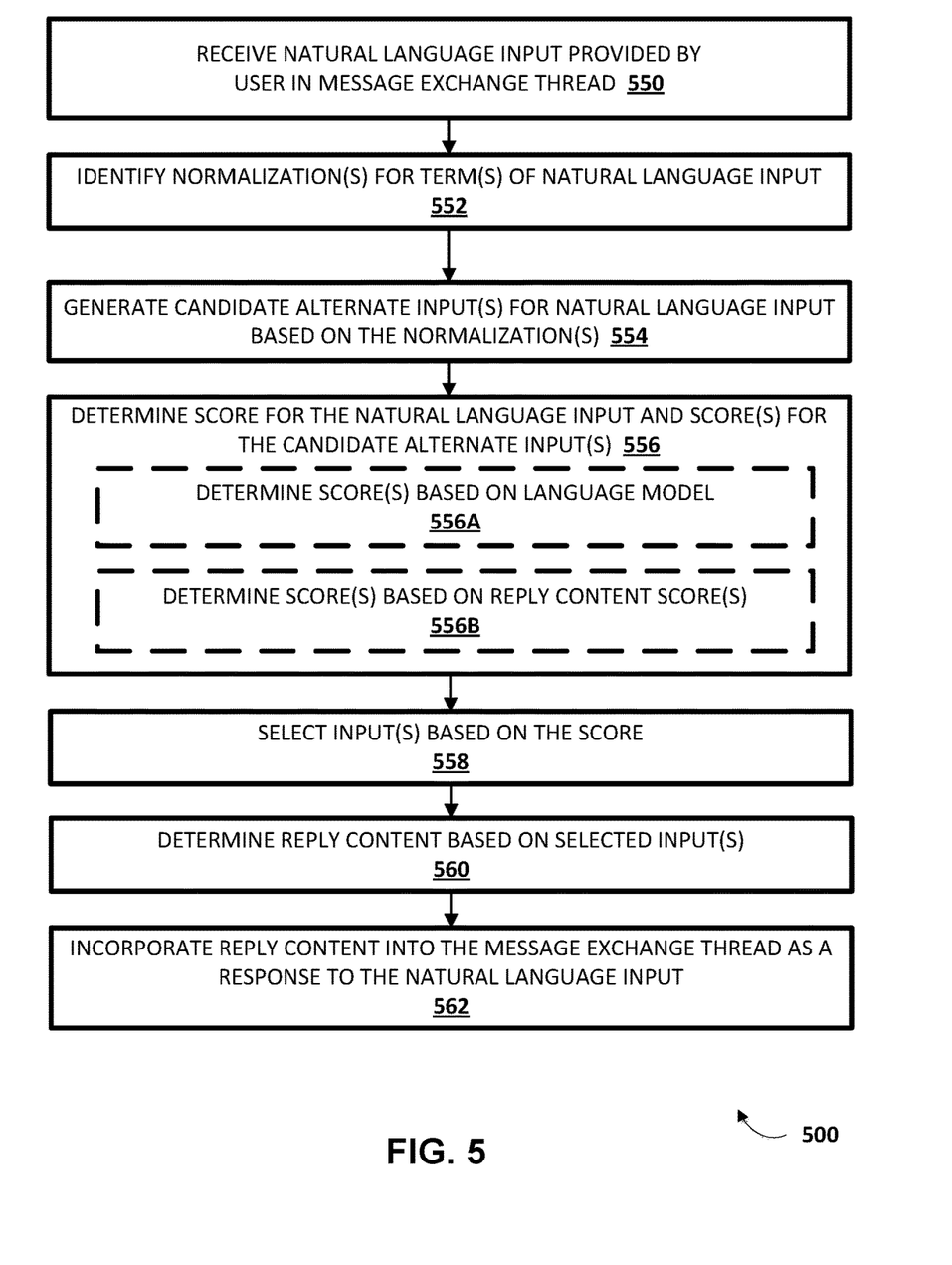
FIG. 5 presents a flow chart illustrating an example method of receiving natural language input that includes chatspeak, translating the chatspeak to a normalized form, utilizing the normalized form to generate reply content that is responsive to the natural language input, and providing that reply content for presentation as a response to the natural language input.

FIG. 5 presents a flowchart illustrating an example method 500 of receiving natural language input that includes chatspeak, translating the chatspeak to a normalized form, utilizing the normalized form to generate reply content that is responsive to the natural language input, and providing that reply content for presentation as a response to the natural language input. For convenience, the operations of the flow chart are described with reference to a system that performs the operations. This system may include various components of various computer systems, such as automated assistant 120. Moreover, while operations of method 500 are shown in a particular order, this is not meant to be limiting. One or more operations may be reordered, omitted or added.

At block 550, the system receives natural language input that is formulated by a user via one or more user interface input devices and provided by the user in a message exchange thread (e.g., a thread between the user and an automated assistant and/or a thread between the user, the automated assistant, and one or more additional users).

At block 552, the system identifies one or more normalizations for each of one or more terms of the natural language input of block 550.

At block 554, the system generates candidate alternate inputs for the natural language input of block 550 based on the normalizations of block 554.

At block 556, the system determines a score for the natural language input of block 554 and determines a score for each of the candidate alternate inputs determined at block 554. In some implementations, in determining the scores, the system determines one or more of the scores based on a language model at block 556A and/or determines one or more of the scores based on reply content scores at block 556B.

At block 558, the system selects one or more (e.g., only one) of the inputs based on the score. In particular, the system selects one or more of the candidate alternate inputs of block 554 and/or the natural language input of block 550 based on the scores for those inputs.

At block 560, the system determines reply content based on the input(s) selected at block 558. For example, the system may determine reply content that is a chat response or reply content that is a search result response.

At block 562, the system incorporates the reply content of block 560 into the message exchange thread as a response to the natural language input.

Figure 6:
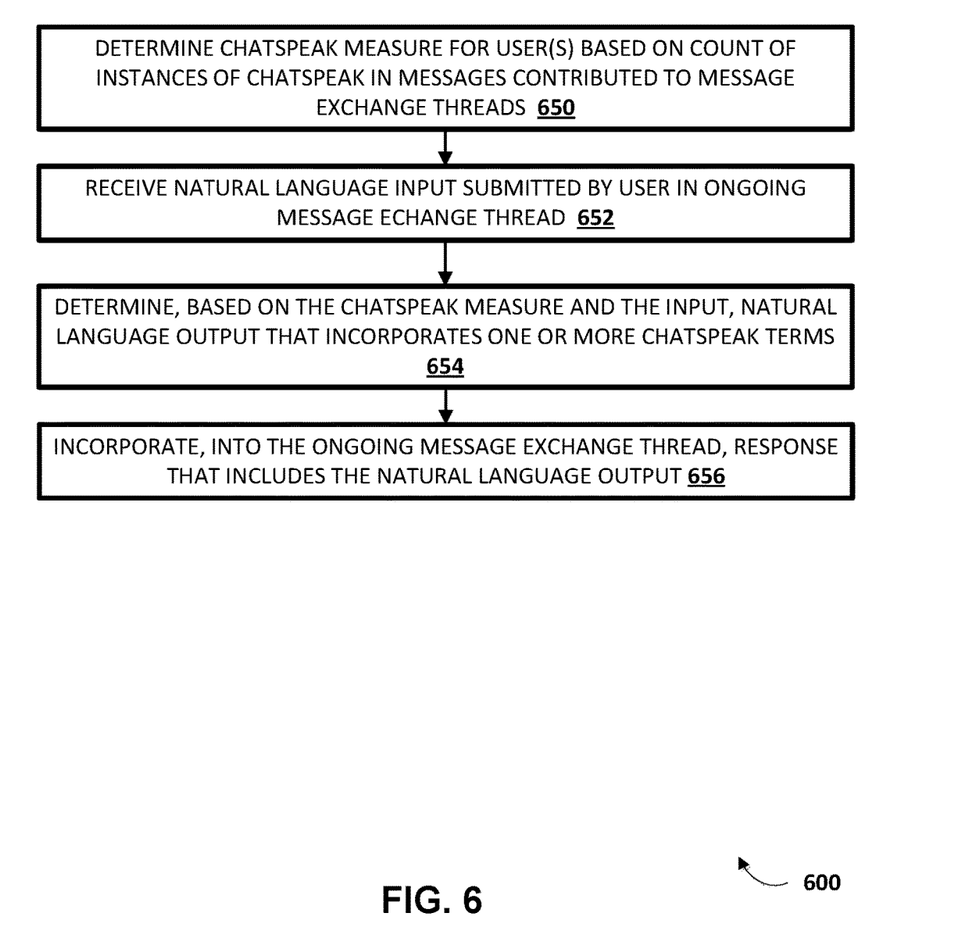
FIG. 6 presents a flow chart illustrating an example method of determining a chatspeak measure for at least one user, receiving natural language input from the user, determining natural language output based on the chatspeak measure and the natural language input, and providing the natural language output for presentation to the user as a response to the natural language input.

FIG. 6 presents a flowchart illustrating an example method 600 of determining a chatspeak measure for a user, receiving natural language input from the user, determining natural language output based on the chatspeak measure and the natural language input, and providing the natural language output for presentation to the user as a response to the natural language input. For convenience, the operations of the flow chart are described with reference to a system that performs the operations. This system may include various components of various computer systems, such as automated assistant 120. Moreover, while operations of method 600 are shown in a particular order, this is not meant to be limiting. One or more operations may be reordered, omitted or added.

At block 650, the system determines a chatspeak measure for one or more users based at least in part on a count of instances of chatspeak in messages contributed to message exchange threads by one or more of the users.

At block 652, the system receives natural language input that is formulated by a user via one or more user interface input devices and provided by the user in an ongoing message exchange thread (e.g., a thread between the user and an automated assistant and/or a thread between the user, the automated assistant, and one or more additional users).

At block 654, the system determines, based on the chatspeak measure determined at block 650 and based on the natural language input of block 652, natural language that incorporates one or more chatspeak terms. In some implementations, the system determines the natural language output that incorporates one or more chatspeak terms based on the chatspeak measure determined at block 650 and based on one or more additional chatspeak measures.

At block 656, the system incorporates, into the ongoing message exchange thread, a response that includes the natural language output of block 654.

Figure 7:
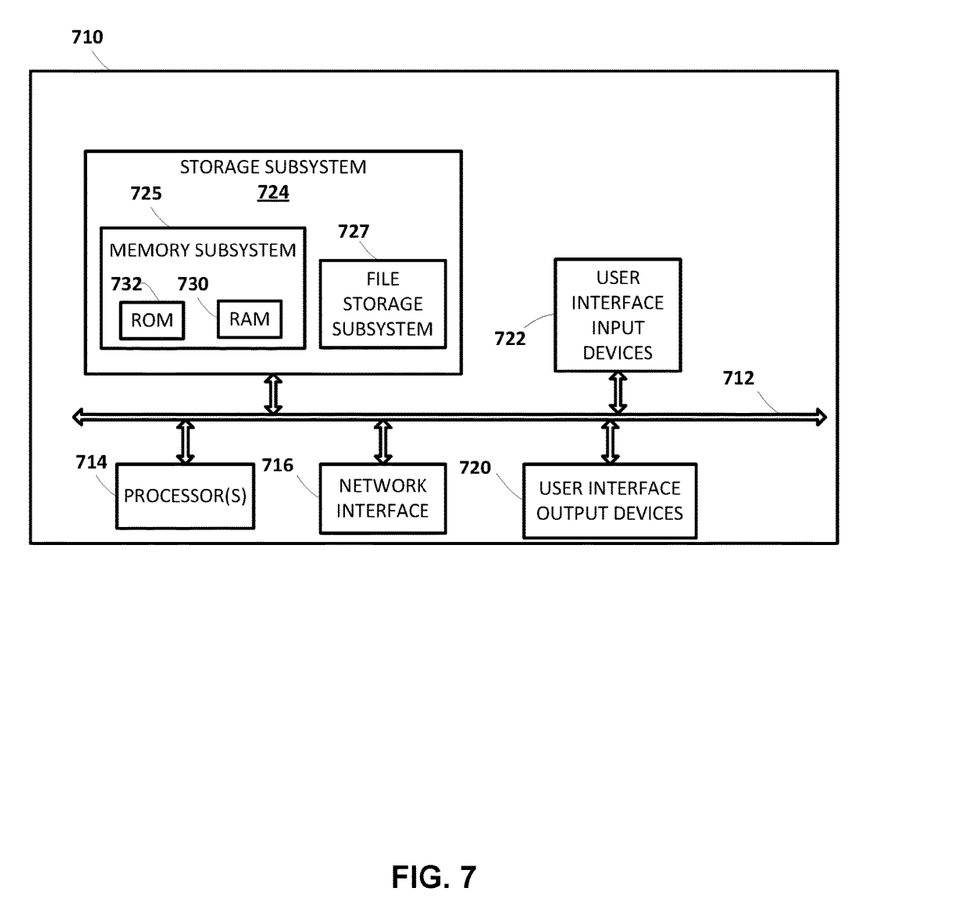
FIG. 7 illustrates an example architecture of a computing device.

FIG. 7 is a block diagram of an example computing device 710 that may optionally be utilized to perform one or more aspects of techniques described herein. In some implementations, one or more of the client computing devices $106_{1-N}$, automated assistant 120, and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the method of FIGS. 5 and 6.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
    receiving natural language input submitted by a user as part of a message exchange thread between at least the user and an automated assistant, the natural language input including at least a first term and a second term, and being formulated by the user via a user interface input device of a computing device of the user;
    identifying, for at least the first term of the natural language input, a first normalization of the first term;
    generating a candidate alternate input for the natural language input, the generating comprising replacing the first term with the first normalization and including, in the candidate alternate input, either the second term or a second normalization of the second term;
    determining a first score for the natural language input based on applying at least the first term and the second term to a language model;
    determining a second score for the candidate alternate input based on applying at least the first normalization and either the second term or the second normalization to the language model;
    selecting the candidate alternate input based on the first score and the second score;
    determining reply content based on the candidate alternate input; and
    incorporating the reply content into the message exchange thread as a response to the natural language input by the automated assistant, wherein incorporating the reply content into the message exchange thread is based on selecting the candidate alternate input.

2. The method of claim 1, wherein incorporating the reply content into the message exchange thread comprises inserting the reply content into a transcript of the message exchange thread that is displayed in a graphical user interface of a message exchange client operating on the computing device of the user.

3. The method of claim 1, further comprising:
    determining a reply content score for the reply content;
    wherein determining the first score is further based on the reply content score.

4. The method of claim 3, wherein the reply content is a scripted response that is mapped to one or more input parameters and wherein determining the reply content score is based on comparison of the candidate alternate input to at least some of the input parameters.

5. The method of claim 3, wherein the reply content is based on one or more search results that are responsive to the candidate alternate input and wherein determining the reply content score is based on a score or characteristic of at least one of the search results.

6. The method of claim 5, wherein determining the reply content score is based on the characteristic of at least one of the search results indicating that the search result is a certain type of search result.

7. The method of claim 1, wherein the language model is an n-gram model and wherein determining the first score for the natural language input based on applying at least the first term and the second term to the language model comprises applying both the first term and the second term to the language model.

8. The method of claim 1, further comprising:
    generating the language model based on normalizations of messages from message exchange threads between humans, wherein the normalizations of the messages replace chatspeak terms of those messages with normalized terms when those chatspeak terms are utilized as chatspeak.

9. The method of claim 1, wherein determining the reply content based on the candidate alternate input comprises searching one or more reply resource databases based on the candidate alternate input.

10. A method implemented by one or more processors, comprising:
    receiving natural language input submitted by a user as part of a message exchange thread between at least the user and an automated assistant, the natural language input being formulated by the user via a user interface input device of a computing device of the user;
    identifying, for a term of the natural language input, a normalization of the term;
    generating a candidate alternate input for the natural language input, the generating comprising including, in the candidate alternate input, the first normalization instead of the term;
    determining a first score for the natural language input based on applying at least the term to a language model;
    determining a second score for the candidate alternate input based on applying at least the normalization to the language model;
    selecting the candidate alternate input based on the first score and the second score;
    determining reply content based on the candidate alternate input; and
    incorporating the reply content into the message exchange thread as a response to the natural language input by the automated assistant, wherein incorporating the reply content into the message exchange thread is based on selecting the candidate alternate input.

* * * * *